Sept. 17, 1935.  J. KRUTTSCHNITT  2,014,384
DOUGH COOKING MACHINE
Filed June 12, 1933   3 Sheets-Sheet 2
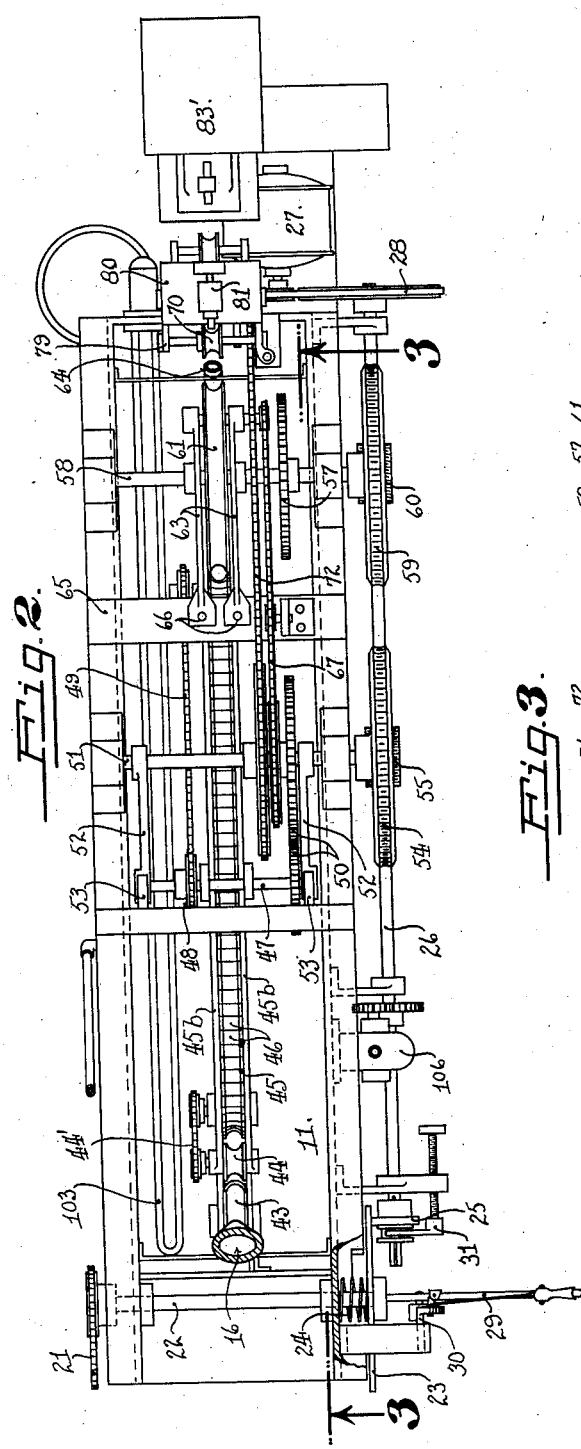
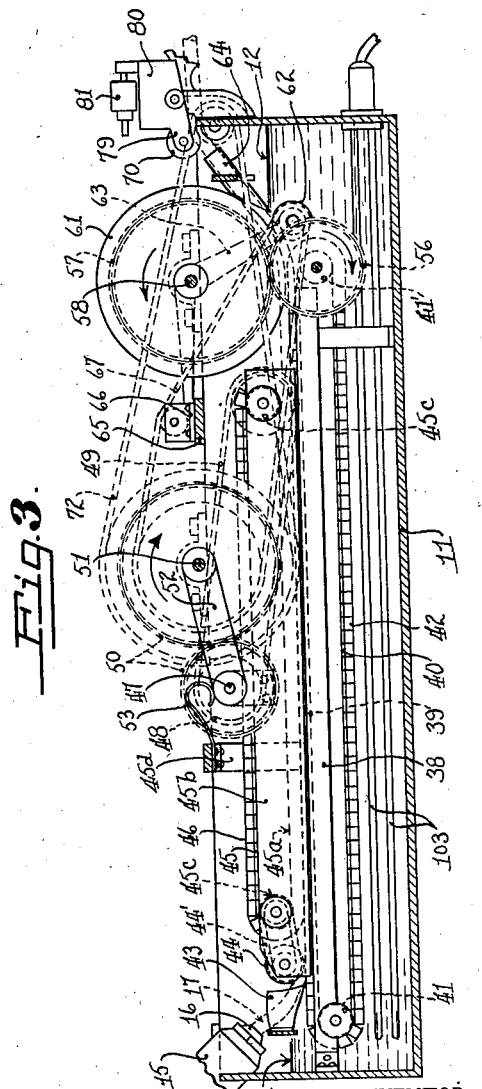
INVENTOR.
JOHN KRUTTSCHNITT.
BY Booth & Booth,
ATTORNEYS.

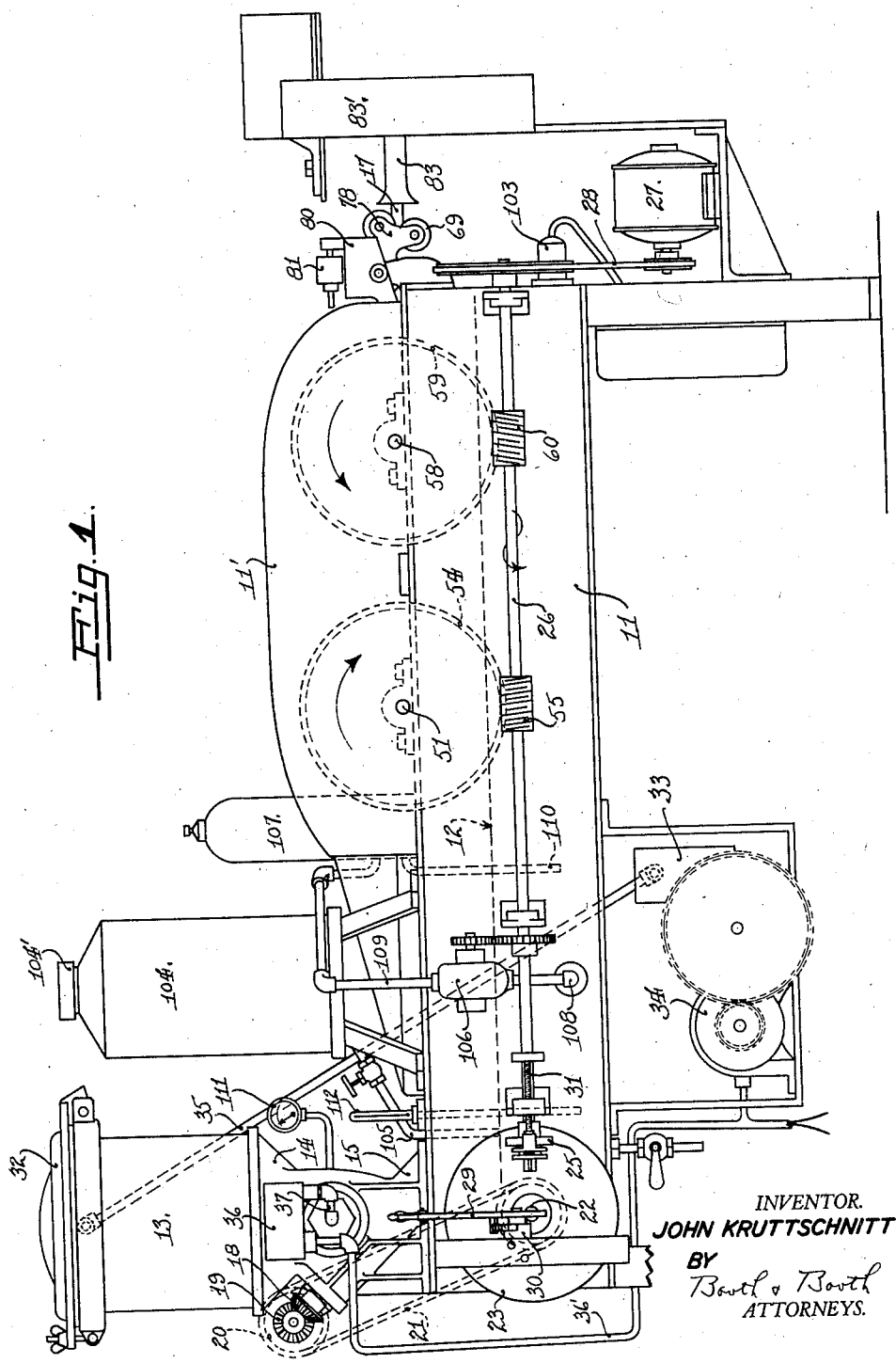

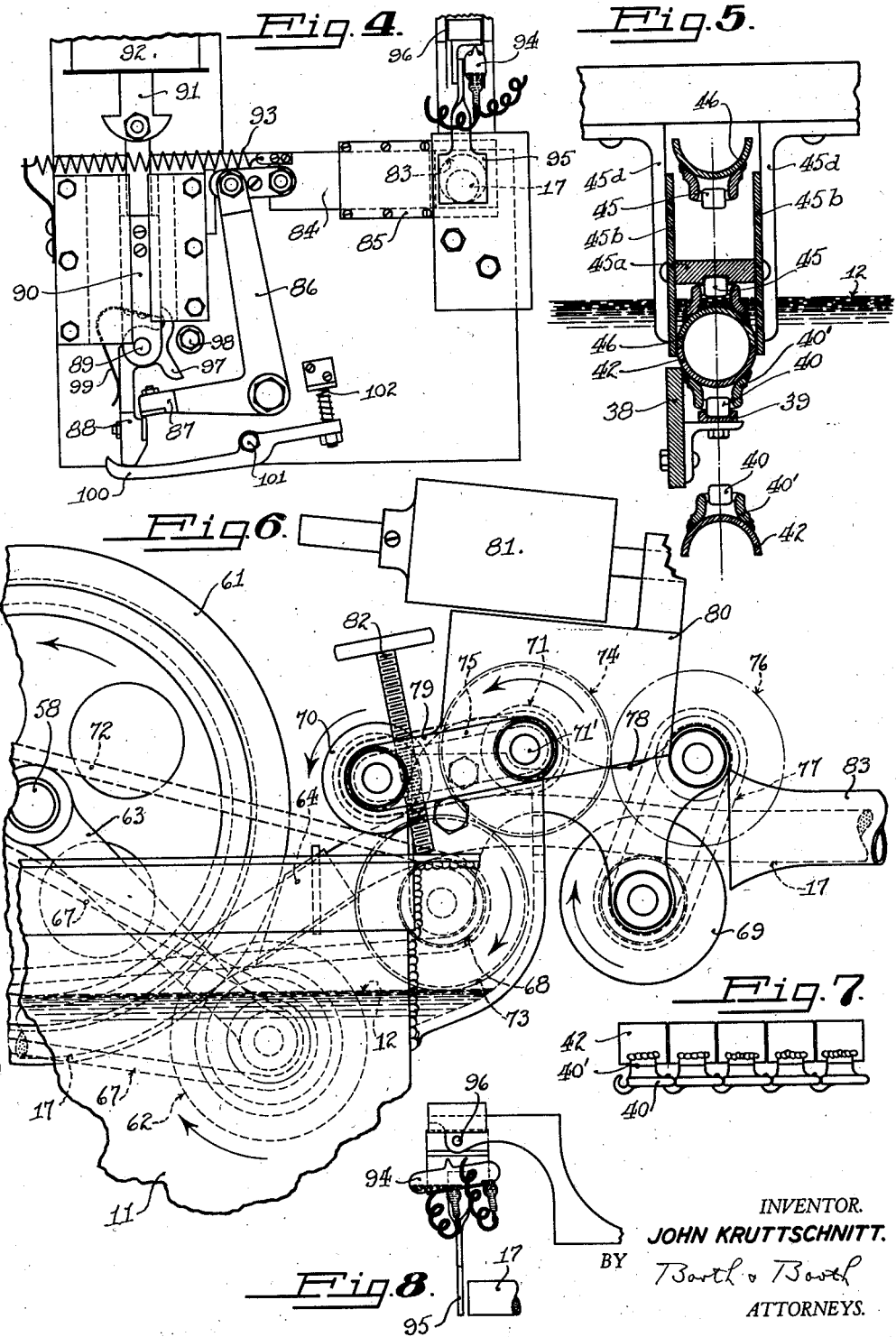

Patented Sept. 17, 1935

2,014,384

UNITED STATES PATENT OFFICE 2,014,384

DOUGH COOKING MACHINE

John Kruttschnitt, San Mateo, Calif.

Application June 12, 1933, Serial No. 675,413

9 Claims. (Cl. 107—4)

The present invention relates to a dough cooking machine of the type in which a continuous strip or rope of dough is passed through a fluid cooking medium such as hot fat, and subsequently cut into lengths suitable for sale.

The present invention constitutes an improvement upon the device of my United States Patent No. 1,806,878.

The principal object of this invention is to provide continuously moving means for keeping the dough submerged in the cooking medium, if the latter be a liquid, to insure even cooking and for inclosing the dough to preserve its shape during its travel through the cooking medium. Other objects of the invention are to provide means for properly regulating the fed dough; for reconditioning the cooking medium and maintaining it at the proper level and temperature; and for automatically cutting the discharging strip of cooked dough into lengths which may be varied at will. Other objects and advantages of the invention will become apparent from the following specification.

The invention is illustrated herein as embodied in a machine especially adapted for cooking fried cakes similar in composition to doughnuts. It may be used, however, for other cooking operations, as will be apparent to those skilled in the art. It is also to be understood that the form, construction and arrangement of the several parts herein shown and described may be varied within the limits of the claims hereto appended without departing from the spirit of the invention as defined in said claims.

A preferred embodiment of the invention will now be described with reference to the accompanying drawings wherein:—

Fig. 1 is a side elevation of the machine, certain parts being shown diagrammatically.

Fig. 2 is a part sectional plan view, with the cover removed.

Fig. 3 is a longitudinal vertical section of the cooking tank, taken on the line 3—3 of Fig. 2.

Fig. 4 is a partly broken end elevation taken from the discharge end of the machine and illustrating the cutting mechanism.

Fig. 5 is a transverse sectional detail, enlarged, of the traveling mold conveyer.

Fig. 6 is an enlarged side elevation of the discharge mechanism and the discharge end of the cooking tank.

Fig. 7 is a side elevation of a portion of the traveling mold conveyer.

Fig. 8 is a side elevation of the control switch for the cutting off mechanism.

In the drawings, the reference numeral 11 designates an elongated tank adapted to contain the cooking medium, which, in the present instance, is a body of heated liquid fat whose surface is maintained at a constant level, as indicated at 12 in Figs. 1 and 3. The tank has a removable cover 11'. The dough is contained within a feed hopper 13, Fig. 1, mounted above the tank 11 at one end thereof. The lower portion 14 of the hopper 13 is funnel shaped and feeds the dough to a screw conveyer of usual form housed within a barrel 15. The axis of the feed screw and its barrel are inclined, as shown, and the lower end of said barrel terminates in a nozzle 16, Fig. 3, from which issues a continuous strip or rope 17 of dough. The nozzle 16 is positioned within the cooking tank 11 slightly above the level 12 of the fat therein.

The dough feed screw within the barrel 15 is driven by a pair of bevel gears indicated at 18 and 19 in Fig. 1, the gear 19 being secured to a sprocket 20, which in turn is driven by a chain 21 from a transverse shaft 22, Figs. 1 and 2. A friction disk 23 is slidably keyed upon the end of the shaft 22, and is pressed outwardly by a spring 24 into contact with a friction wheel 25 slidably keyed upon the end of a longitudinal shaft 26 mounted upon the side of the tank 11. A motor 27 drives the shaft 26 through a chain or belt 28. A lever 29 mounted upon a bracket 30 has its end bearing against the center of the disk 23, so that by moving the lever 29, said disk may be moved inwardly against the resistance of the spring 24 to throw it out of engagement with the friction wheel 25, to stop the dough feed screw at will. Means indicated at 31 are provided for shifting the friction wheel 25 longitudinally along its shaft 26 to vary the speed of the dough feed screw.

The dough hopper 13 has a tight fitting cover 32, Fig. 1. An air compresser indicated at 33, driven by a motor 34, supplies air under pressure through a pipe 35 to the hopper 13 to force the dough down into the feed screw. The pressure within the hopper 13 is maintained at any desired value by means of an automatic pressure actuated switch of any well known form indicated at 36, said switch being connected with the lower portion or throat of the hopper by a pipe 37. The switch 36 controls the operation of the motor 34 in the usual manner, the electrical connections therefor being well known and indicated as a conduit 36', starting and stopping the air compresser 33 as the pressure in the hopper falls below the desired point or rises above it. The pressure control switch 36 is adjustable, as customary in such devices, so that the pressure upon the dough within the hopper 13 can be raised or lowered as desired, and this together with the speed adjustment 31 of the feed screw enables the operator to feed the dough at the proper rate.

A longitudinally disposed fixed support 38, Figs. 3 and 5, is mounted within the tank below the fat level 12, and carries a horizontal track 39, said track extending from the forward end of the tank beneath the dough feed nozzle 16, nearly to its rear end. An endless conveyer chain 40, operating over sprockets 41 and 41', has its upper run resting and traveling upon said track 39. The links of the chain 40 have extensions 40' Figs. 5 and 7, to which are welded flights 42, said flights having their upper surfaces grooved or semicircular and fitting closely together when the chain is running upon the track 39, to form a continuous grooved or semicylindrical trough. The stream or rope of dough 17, issuing from the nozzle 16, descends through a guide chute 43, Figs. 2 and 3, and passes under a grooved sheave 44, by which it is deposited within the advancing continuous trough formed by the conveyer flights 42. The dough thus lies in said trough and is advanced thereby toward the rear or discharge end of the machine.

A second endless conveyer chain 45, Figs. 3 and 5, is positioned above and parallel with the chain 40. The chain 45 is somewhat shorter than the chain 40, but is identical therewith in construction, having grooved flights 46. The lower run of the upper chain 45 travels beneath a horizontal track 45a secured between two parallel vertical plates 45b and is held by said track against the upper run of the lower chain 40, the flights 42 and 46 complementing each other to form a continuously moving cylindrical casing or mold, surrounding the dough to retain it in proper shape and size and to advance it toward the rear end of the machine while holding it beneath the level 12 of the fat. By this means the dough is kept submerged in the fat for the proper length of time to insure thorough and even cooking, the heat of the fat being transmitted to the entire surface of the dough by conduction through the walls of the surrounding mold, and it is prevented from rising to the surface of the fat and floating thereupon, which condition would result in cooking only the lower portion of the dough.

The parallel plates 45b and the track 45a constitute a vertically movable floating frame within which the upper conveyer chain 45 is carried, its sprockets 45c being mounted between said plates near their ends. This frame and the chain 45 are supported by the lower chain 40, and are held in place laterally by suitable spaced guides, one pair of which is shown at 45d in Fig. 5. A transverse shaft 47, Figs. 2 and 3, is mounted in journals secured to the movable frame plates 45b, and carries a sprocket 48 connected by a chain 49 with the rear sprocket 45c of the chain 45. The shaft 47 is suitably driven, as by means of gears indicated at 50, from a transverse shaft 51 journaled upon the main fixed frame of the machine above the tank 11. Links 52 keep the shafts 47 and 51 in proper spaced alignment, and also prevent the movable frame and upper conveyer 45 from shifting longitudinally. Springs 53 press said frame and upper chain downwardly, in addition to the weight thereof, so that the dough is firmly but yieldably held within the advancing cylindrical mold formed by the abutting flights 42 and 46 of the two chains. The guide sheave 44 is driven from the forward sprocket 45c of the chain 45 by a short chain 44'. The shaft 51 carries a worm gear 54, Figs. 1 and 2, outside the tank, which is driven by a worm 55 upon the longitudinal drive shaft 26.

The lower conveyer chain 40 is driven by a spur gear 56 upon the shaft of its rear sprocket 41', which meshes with a gear 57 upon a transverse shaft 58 journaled on the frame of the machine above the tank 11. A worm wheel 59 on the end of said shaft 58 is driven by a worm 60 on the drive shaft 26. Thus the two cooperating conveyer chains 40 and 45 are driven at the same speed, so that their contiguous runs travel in the same direction, that is, from the front toward the rear of the tank 11.

The upper conveyer chain 45 is somewhat shorter than the lower chain 41, as is shown in Fig. 3. After the dough passes from beneath the flights of the upper chain, it is carried under a guide sheave 61 upon the shaft 58 which keeps it in the trough of the flights of the lower chain and therefore still submerged in the fat. Immediately behind the rear end of the lower chain is a guide sheave 62 journaled in depending arms 63. The sheave 62 raises the cooked dough, causing it to follow a short arc around the sheave 61, and directs it angularly upwardly into an inclined guide tube 64. The forward ends of the arms 63 are secured to a frame cross member 65 at 66, and they are journaled about the shaft 58 for further support. The sheave 62 is driven by a chain 67 from a sprocket on the shaft 51.

When the cooked dough leaves the upwardly inclined guide tube 64, it passes between a series of guide and discharge sheaves or rollers shown in Fig. 6. The sheaves 68 and 69 are below the dough and serve both to guide and to support it. The sheaves 70 and 71 are above the dough, and guide it and hold it in contact with the lower sheaves. The sheave 68 is driven by a chain 72 from a sprocket on the shaft 51, and has a spur gear indicated at 73 secured to its shaft, said gear meshing with a gear indicated at 74 upon the shaft of the sheave 71. The sheave 70 is driven by a short chain 75 from the sheave 71, and the sheave 69 is driven by a gear indicated at 76 and a chain 77 from the gear 74. Thus all four sheaves 68, 69, 70 and 71 are positively driven to advance the cooked dough out of the tank 11 and feed it to the cutting off mechanism to be described later.

The journals of the sheaves 68, 69 and 71 are carried by a fixed bracket 78 secured to the frame of the machine. The sheave 70, however, is journaled in a swinging bracket 79, which is fulcrumed about the axis 71' of the sheave 71 so that the sheave 70 can swing up and down, thus clamping the dough yieldably between the sheaves 68 and 70. The swinging bracket 79 of the sheave 70 is extended upwardly, as at 80, and is provided with a slidable weight 81, by the adjusting of which the pressure of the sheave 70 upon the top of the dough can be varied. A screw 82, threaded through the bracket 79 and bearing upon the frame of the tank 11, adjustably limits the downward movement of said sheave 70.

After the cooked dough passes between the discharge sheaves above described, it enters a short tube 83 which carries it to the cutting mechanism, designated generally by the numeral 83' in Fig. 1 and shown in detail in Fig. 4. A transversely slidable knife 84 Fig. 4, operates in a guide 85 to cut off the dough passing out of the discharge end of the guide tube 83. The knife 84 is connected with a bell crank 86 whose horizontal end 87 is engaged by a hooked link 88 pivoted at 89 to a vertical slide 90 connected with the armature 91 of a solenoid 92. Thus when the solenoid is energized, the slide 90 is elevated, raising the arm 87 and causing the knife 84 to slide across the end of the guide tube 83 to cut off the cooked dough issuing therefrom. A spring 93 returns the knife to the position shown.

The solenoid 92 is controlled by a mercury contact switch 94, Figs. 4 and 8, operated by a swinging trigger plate 95 which is pivotally hung at 96 and is positioned in the path of the exuding dough 17 a short distance away from the discharge end of the tube 83. When the cooked dough impinges against the plate 95 and swings it outwardly, the switch 94 is tilted to close an electric circuit (not shown) to the solenoid 92, thereby energizing it and causing the knife 84 to cut off the dough at the end of the tube 83. The cut piece of dough thereupon falls into a suitable receptacle (not shown), and the switch plate 95 swings back to its normal vertical position, opening the circuits and allowing the solenoid armature 91 to drop. Inasmuch as the cooked dough is advancing continuously, it is necessary that the knife 84 be withdrawn instantly after the cutting operation. This is accomplished by releasing the hook 88 from the bell crank arm 87 immediately upon the completion of their upstroke. The hook 88 is provided with a cam extension 97, Fig. 4, which upon the upward movement of said hook, strikes against a roller journaled upon a fixed pin 98, thereby swinging said hook to the left and causing it to release the bell crank arm 87 at the end of its upstroke, whereupon the spring 93 immediately returns the knife 84 to its normal position out of the path of the advancing dough and before the switch 94 has opened the solenoid circuit. In order to re-engage the hook 88 with the arm 87 upon the dropping of the armature 91, there is provided a spring 99 and a cam 100, the latter engaging the bottom end of the hook, and causing it to swing to the right beneath the end of the arm 87. The cam 100 is resiliently mounted by being pivoted at 101 and having a cushioning spring 102 to hold it in its normal upper position, as shown.

Any suitable means may be provided for heating the fat in the tank 11. I prefer to use an electric heater indicated at 103, Figs. 2 and 3, which is preferably controlled by a suitable thermostatic switch (not shown), in any well known manner. A reservoir 104, Fig. 1, is mounted above the tank 11 and contains a supply of fat to augment that within the tank when necessary. A valve controlled pipe 105 leads from the reservoir 104 to the tank. The reservoir has an air tight cover 104', and the pipe 105 terminates at the fat level 12 in the tank 11, so that said level is automatically maintained as long as the valve in the pipe 105 is open. Means are also provided for reconditioning the fat within the tank, comprising a circulating pump 106 driven from the shaft 26, and a suitable filter indicated at 107. The pump 106 draws the grease out from the lower portion of the tank 11 at 108, and forces it through a pipe 109 to the filter 107 from which it returns to the tank through a pipe 110.

It will be seen from the foregoing that the dough issues from the nozzle 16 of the hopper 13 in a continuous strip or rope; that it is embraced by the traveling cylindrical mold formed by the flights of the cooperating conveyer chains 40 and 45, being held in shape thereby and also being kept submerged in the cooking medium to insure an even cook; and that the cooked dough, issuing continuously, is automatically cut into desired lengths. It should be noted that the dough stream or rope is kept under adequate control at all times, so that it is not liable to be broken, the guide 43 and sheave 44 transferring it from the nozzle 16 to the conveyer mold, and the succession of sheaves and guides at the rear end of the machine elevating the cooked dough out of the fat and passing it to the cutting knife. The speed of the feed screw and the pressure within the hopper 13 can be varied, according to the consistency of the dough, to insure its feed to the conveyer mold at the proper rate to fill said mold without squeezing out between the joints thereof. A pressure gauge 111 indicates the pressure within the dough hopper 13, and a thermometer 112 registers the temperature of the cooking fat in the tank 11.

To avoid confusion, the details of certain parts have been omitted from the drawings, such as the pressure controlled switch 36 for the compressor motor, the switch 94 for the cutting solenoid, the electrical connections for these devices, etc., all of which are standard articles of manufacture and form no part of the present invention except insofar as their functions affect the operation of the other parts of the machine.

Obviously, the cutting mechanism 83' may be positioned between the feed hopper 13 and the cooking tank 11 in which case the dough would pass through the cooking medium as a series of short pieces, positioned and held end to end within the continuously advancing mold, but as such a change would be merely a re-arrangement of the parts herein described and illustrated, a separate showing thereof has been omitted for the sake of brevity.

I claim:—

1. A dough cooking machine comprising means for feeding a continuous strip of dough, and a continuously traveling mold for enclosing and advancing said strip of dough through a cooking medium, said mold comprising a plurality of longitudinally juxtaposed sections cooperating in end to end relation to form a continuous tube.

2. In a dough cooking machine, a traveling mold comprising a pair of chain conveyers having adjacent runs parallel and moving in the same direction, and longitudinally grooved flights carried by said chains, the flights of the adjacent runs thereof cooperating to form a longitudinally continuous tubular mold.

3. In a dough cooking machine, a traveling mold comprising a pair of chain conveyers having adjacent runs parallel and moving in the same direction, longitudinally concave flights carried by said chains, the flights of the adjacent runs thereof cooperating to form a longitudinally continuously tubular mold, means for feeding dough continuously to said mold, and means for cooking the dough within said mold.

4. A dough cooking machine comprising a tank for containing a body of cooking liquid, a pair of chain conveyers having parallel and adjacent runs moving in the same direction within said tank, grooved flights carried by said chains, the flights of the adjacent runs thereof cooperating to form a continuous mold traveling beneath the surface of the liquid, means for feeding dough to one end of said mold, and means for removing the dough from the other end of said mold.

5. A dough cooking machine comprising a tank for containing a body of cooking liquid, means for feeding a continuous strip of dough thereto, means for advancing said dough strip through said liquid, a plurality of rollers for elevating said strip out of said liquid, one of said rollers bearing yieldably upon the top of the strip, means for varying the pressure of said yieldable roller upon the strip, and means for rotating one of said rollers to assist in advancing the strip.

6. A dough cooking machine comprising a pair of chain conveyers having parallel and adjacent runs moving in the same direction; flights carried by said chains, the flights of the adjacent runs thereof cooperating to form a continuous tubular dough containing mold; a yieldable frame upon which one of said chains is mounted and by which it is held in cooperative mold forming relation to the other chain; and means for heating said mold to cook the dough therein.

7. A dough cooking machine comprising a pair of endless conveyers having parallel and adjacent runs moving in the same direction and positioned one above the other, said adjacent runs cooperating to form a continuous tubular dough containing mold; a yieldable frame upon which the upper conveyer is mounted, the weight of said frame and upper conveyer being borne by the lower conveyer, whereby the adjacent runs of said conveyers are yieldably held in mold forming relation; and means for heating said mold to cook the dough therein.

8. A dough cooking machine comprising a pair of endless conveyers having parallel and adjacent runs moving in the same direction and positioned one above the other, said adjacent runs cooperating to form a continuous tubular dough containing mold; a vertically movable frame upon which the upper conveyer is mounted; means for preventing horizontal movement of said frame without impeding its vertical movement, whereby said upper conveyer rests upon the lower conveyer in mold forming relation; and means for heating the dough therein.

9. In a dough cooking machine, means for feeding a continuous strip of dough, and a continuous traveling mold for enclosing and advancing said strip of dough through a cooking medium, said mold comprising two series of connected grooved sections, the sections of each series being arranged in end to end relation, and the two series being arranged in side by side relation, whereby said sections cooperate to form a continuous tubular mold.

JOHN KRUTTSCHNITT.